United States Patent
Sun et al.

(10) Patent No.: US 10,336,641 B2
(45) Date of Patent: Jul. 2, 2019

(54) METHOD FOR PRODUCING A FOAM GLASS WITH HIGH OPEN PORE CONTENT

(75) Inventors: Xiaolong Sun, Singapore (SG); Qingchi Xu, Singapore (SG)

(73) Assignee: Ngee Ann Polytechnic, Singapore (SG)

( * ) Notice: Subject to any disclaimer, the term of this patent is extended or adjusted under 35 U.S.C. 154(b) by 1274 days.

(21) Appl. No.: 14/394,034

(22) PCT Filed: Apr. 11, 2012

(86) PCT No.: PCT/SG2012/000129
§ 371 (c)(1),
(2), (4) Date: Dec. 29, 2014

(87) PCT Pub. No.: WO2013/154499
PCT Pub. Date: Oct. 17, 2013

(65) Prior Publication Data
US 2018/0297885 A1  Oct. 18, 2018

(51) Int. Cl.
*C03B 19/08* (2006.01)
*C03B 19/09* (2006.01)
*C03C 11/00* (2006.01)

(52) U.S. Cl.
CPC .............. *C03B 19/08* (2013.01); *C03B 19/09* (2013.01); *C03C 11/007* (2013.01)

(58) Field of Classification Search
CPC ........ C03C 11/007; C03B 19/08; C03B 19/09
See application file for complete search history.

(56) References Cited

U.S. PATENT DOCUMENTS

| | | | | |
|---|---|---|---|---|
| 3,348,933 A | * | 10/1967 | Schulz | C03B 19/08 65/141 |
| 3,623,897 A | * | 11/1971 | Wojcik | C03C 3/118 106/14.05 |
| 3,666,506 A | * | 5/1972 | Cowan, Jr. | C03C 11/007 264/43 |
| 3,951,632 A | * | 4/1976 | Seki | C03C 11/007 65/22 |
| 3,963,503 A | * | 6/1976 | Mackenzie | C03B 19/06 501/39 |

(Continued)

FOREIGN PATENT DOCUMENTS

| | | | | |
|---|---|---|---|---|
| JP | 2001302261 A | * | 10/2001 | C03B 19/08 |
| KR | 20020015460 A | * | 2/2002 | C03C 1/002 |

(Continued)

OTHER PUBLICATIONS

International Search Report and Written Opinion for International Application No. PCT/SG2012/000129, Search completed May 10, 2012, dated May 18, 2012, 7 Pgs.

(Continued)

*Primary Examiner* — Erin Snelting
(74) *Attorney, Agent, or Firm* — Konrad Raynes Davda & Victor LLP; William P. Wilbar, IV

(57) ABSTRACT

A method for producing foam glass with high open pore content using recycled waste glass. The size of the pores of the foam glass is small and uniform, and such foam glass is suitable for building material with thermal insulating and sound proofing properties. The foam glass produced by this method is lightweight, durable and has high compression strength.

24 Claims, 9 Drawing Sheets

(56) References Cited

U.S. PATENT DOCUMENTS

| | | | | | |
|---|---|---|---|---|---|
| 3,974,315 | A | * | 8/1976 | Murata | C03C 11/007 428/212 |
| 3,975,174 | A | * | 8/1976 | Camerlinck | C03B 19/08 65/22 |
| 4,192,664 | A | * | 3/1980 | Joshi | C03B 19/08 106/1.05 |
| 4,404,291 | A | * | 9/1983 | Kiefer | C03B 19/06 501/81 |
| 4,734,322 | A | * | 3/1988 | Favre | C03C 11/007 156/78 |
| 4,833,015 | A | * | 5/1989 | Furuuchi | C03B 19/08 428/309.9 |
| 4,990,398 | A | * | 2/1991 | Fukumoto | C03C 11/007 264/44 |
| 5,516,351 | A | * | 5/1996 | Solomon | C03C 11/007 264/41 |
| 5,821,184 | A | * | 10/1998 | Haines | B24D 3/28 501/39 |
| 5,928,773 | A | * | 7/1999 | Andersen | C03C 11/007 264/44 |
| 2002/0038919 | A1 | * | 4/2002 | Gontmakher | C03C 11/007 264/42 |
| 2002/0142911 | A1 | * | 10/2002 | Akaishi | C03C 1/002 501/84 |
| 2003/0145534 | A1 | * | 8/2003 | Hojaji | B32B 5/18 52/167.1 |
| 2007/0186467 | A1 | * | 8/2007 | Ramsey | C03B 19/08 47/59 S |
| 2013/0108855 | A1 | * | 5/2013 | Marchelli | A01G 9/022 428/221 |
| 2015/0336836 | A1 | * | 11/2015 | Lehman | C03C 11/007 134/6 |

FOREIGN PATENT DOCUMENTS

| | | |
|---|---|---|
| WO | 2003016232 A1 | 2/2003 |
| WO | 2007061312 A1 | 5/2007 |

OTHER PUBLICATIONS

International Preliminary Report on Patentability for International Application No. PCT/SG2012/000129, Report dated Oct. 14, 2014, dated Oct. 23, 2014, 5 Pgs.

* cited by examiner

METHOD FOR PRODUCING A FOAM GLASS WITH HIGH OPEN PORE CONTENT

FIELD OF THE INVENTION

This invention relates to a method for producing foam glass with high open pore content. More particularly, this invention relates to a method for producing foam glass for building materials with thermal insulating and sound proofing properties. Still more particularly, this invention relates to a method for producing light and durable foam glass having high compressive strength in a cost effective manner utilizing recycled waste glass.

PRIOR ART

Materials used in the construction industry are required to have high mechanical strength while being cost effective to produce in bulk. The compressive strength or compression strength of a material is a measure of the amount of stress at which a material fails under a load. The concept of using foam glass as a construction material is well known in the prior art. Specifically, foam glass is commonly used because of its excellent heat and sound insulating characteristics and its light weight. In addition to the above, foam glass is also heat resistant and chemically stable. For such applications, the density of the foam glass should be low as foam glass with lower densities normally have greater void volume which in turn results in improved insulating properties.

Foam glass is typically produced by foaming glass powder. Specifically, glass powder, which may be obtained by grinding ordinary glass such as glass bottles or glass jars, into fine granules of glass, is mixed with gas forming agents, typically carbon or sulphur generating substances such as carbonates and/or sulfates. The mixture is then heated rapidly in a mold to foaming temperatures in order for the glass granules to become viscous and fuse together forming a glass body. At this foaming temperature, decomposition of the foaming agents occur, releasing gases into the viscous glass mixture. The released gases then expand the glass body, forming a coherent porous glass body that slowly expands in volume as more gases are released by the decomposition of the foaming agents. Foam glass may be manufactured using a wide variety of methods with varying compositions of glass powder and foaming agents. Glass powder may also be produced from specially prepared materials, such as water glass, which has been melted at high temperatures and then subsequently ground into fine particles or from waste glass that has been ground or ball-milled into fine ground glass.

Foam glass with excellent thermal insulation properties may be produced by forming foam glass with low densities. Attempts have been made in the art to further lower the density of the foam glass. However, the problem faced by foam glass with low densities is that such foam glass lacks compressive and flexural strength. Such foam glass are typically brittle and may easily break when exposed to strong forces. Therefore, those skilled in the art are constantly striving to find a low cost method to produce foam glass with excellent thermal and sound insulating properties while having sufficiently high compressive and flexural strength.

A method for producing a foam glass having a closed-pore texture with compressive strength between 1.57 MPa and 2.6 MPa with a bulk density between 0.19 $gcm^{-3}$ and 0.22 $gcm^{-3}$ is described in European Patent Application No. 04793771.9, published on 2 Jun. 2005 in the name of Zinoviev, Andrei Adolfovich et. al. In this document, a foam glass with a closed-pore texture is produced by first mixing an aqueous alkaline solution of sodium silicate and/or potassium silicate and powdered additives containing un-graded cullet and a carbonaceous foaming agent at a temperature not exceeding 70° C. Secondly, the mixture is then heat treated at a temperature range between 450° C. and 550° C. until a dehydrated composition is obtained. Thirdly, the cooled composition is then reduced to a powder form by grinding the cooled composition. In the fourth step, the powder is loaded into molds that are treated with a special composition. The molds are then heated to a foaming temperature range between 750° C. and 830° C. and maintained at this temperature range until the foaming process of the powder is completed. Finally, the produced foam glass is then cooled to room temperature.

Another method for producing a foam-like mineral and structural material encompassing an open and/or closed porous structure is disclosed in U.S. Pat. No. 6,497,945, published on 24 Dec. 2002 in the name of Peter Niedner et. al. In this document, the starting material to produce the foam-like material consists of an alkali-silicate and/or an ammonium silicate matrix that is subsequently dried using microwaves at temperatures up to 100° C. The use of microwaves in the drying of the mixture permits the intensity and the duration of the energy applied to the mixture to be controlled ensuring careful treatment of the mixture. The dried mixture is then heated to the foaming temperature range between 100° C. and 700° C. to produce the final foamed article.

Yet another method for producing foamed silicate structures having compressive strengths in the range between 0.3 MPa and 1.0 MPa and bulk densities between 0.05 $gcm^{-3}$ and 0.15 $gcm^{-3}$ is disclosed in U.S. Pat. No. 3,261,894, published on 19 Jul. 1966 in the name of Alois Seidl. In this document, foamed silicate structures are produced by initially formulating a solution by dissolving an alkali metal silicate and an inorganic fibrous silicate in water. The solution is then heated to a temperature range between 140° C. and 360° C. to drive off any free water phase, producing a substantially dried mass having about 10%-15% chemically combined water in the matrix. The dried mass is then pulverized to obtain particles around 0.001 mm-10 mm in size. The particles are then placed in a mold and heated to a temperature range between 700° C. and 900° C. until a viscous foamed structure is obtained. The foamed structure is then cooled, producing a rigid structure that has excellent thermal, acoustical, mechanical and weathering properties.

Another method for producing a cellulated vitreous material with a bulk density about 0.17 $gcm^{-3}$ is disclosed in U.S. Pat. No. 4,198,224, published on 15 Apr. 1980 in the name of John D. Kirkpatrick. In this document, the first step in producing foam glass involves ball milling a cellulating agent such as carbon black together with glass cullet of conventional soda lime glass. The ball milled mixture is then poured into a mold and subjected to a sintering temperature range between 650° C. and 760° C. and maintained at that temperature range until the vitreous material in the glass batch becomes soft and coalesce. The sintered material is then subsequently cooled and comminuted. The comminuted material is screened to ensure that only pellets of a predetermined size are further sintered. The screened pellets are then poured into another mold and subjected to cellulating temperatures until the desired cellular material is attained. The resulting material is then cooled, quenched and annealed.

The methods disclosed in the prior art involve the step of heating the composition comprising of glass and foaming agents together with the mold to foaming temperatures. Moreover, the open pore content of the foam glass products are usually not high. Thus, there is a need in the art for a more efficient process to produce foam glass with high compressive strength and low bulk density, while possessing a high open pore content.

SUMMARY OF INVENTION

The above and other problems in the art are solved and an advance in the art is made in accordance with this invention. A first advantage of the method disclosed in this invention is that by compressing the glass particles, foaming agents and binding agent mixture, the size of the pores of the foam glass will be smaller and more uniformed. A second advantage of the method disclosed in this invention is that by compressing the mixture mentioned above, the produced foam glass will also have higher compressive strength and higher dimensional stability during foaming. A third advantage of the method disclosed in this invention is that when the compressed mixture is heated in a two step heating process, this allows for the controlled foaming of the various concentrations of foaming agents within the mixture. The controlled foaming produces a uniformed porous glass body with a high content of open pores. A fourth advantage of a foam glass produced in accordance with this invention is that the foam glass has compressive strength between 2.1 MPa and 2.8 MPA and flexural strength between 0.9 MPa and 1.5 MPa. A fifth advantage of a foam glass produced in accordance with this invention is that the foam glass has bulk densities between 0.17 gcm$^{-3}$ and 0.22 gcm$^{-3}$.

A method for producing a foam glass in accordance with this invention is performed in the following manner. The method begins by combining glass particles with foaming agents, additives and a binding agent to form a mixture. The mixture is then compressed in a mold with a compression pressure between 2 MPa and 20 MPa for a period of time between 30 seconds and 15 minutes to produce a compressed sample. The compressed sample is then de-molded from the mold and cured. Part of the foaming agents within the sample is then decomposed, generating gases within the sample. This occurs when the sample is heated to a first elevated temperature and maintained at this first elevated temperature for a first period of time. The remainder of the foaming agents within the sample are then decomposed when the sample is heated from the first elevated temperature to a second elevated temperature and maintained at this second elevated temperature for a second period of time. For the annealing of the sample, the sample is cooled from the second elevated temperature to a first lowered temperature for a third period of time. The annealed sample is then cooled to room temperature. The resulting foam glass sample has an open pore content between 88% and 95%, compressive strength between 2.1 MPa and 2.8 MPa, and bulk densities between 0.17 gcm$^{-3}$ and 0.22 gcm$^{-3}$.

In accordance with embodiments of this invention, the foaming agents are selected from a group of foaming agents comprising of calcium carbonate, sodium carbonate, strontium carbonate, magnesium carbonate, calcium sulphate, silicone, silicon carbide, carbon black, dolomite, antigorite, silicon nitride, coke, ammonium nitrite, poly(vinyl alcohol), poly(ethyleneglycol) and sugar. In accordance with some embodiments of this invention, the foaming agents are between 0.2 wt % and 10 wt %. In accordance with preferred embodiments of this invention, the foaming agents specifically comprise of calcium carbonate, carbon black and poly(ethyleneglycol).

In accordance with embodiments of this invention, the additives are selected from a group of additives comprising of sodium tetraborate, sodium phosphate monobasic, sodium phosphate dibasic, boric acid, sodium nitrite, manganese oxide, antimony oxide, sodium hexafluorosilicate and sodium metasilicate. In accordance with some embodiments of this invention, the additives are in the range between 0.1 wt % and 10 wt %. In accordance with preferred embodiments of this invention, the additives comprise of sodium tetraborate.

In accordance with embodiments of this invention, the binding agent comprises a sodium silicate solution that is in the range between 0 wt % and 20 wt %.

In accordance with embodiments of this invention, the size of the glass particles are between 1 μm and 100 μm.

In accordance with embodiments of this invention, the foaming agents comprise of calcium carbonate, carbon black and poly(ethyleneglycol), the additives comprise of sodium tetraborate, and the binding agent comprises of a sodium silicate solution. The content of the foaming agents are between the range 0.2 wt % and 10 wt %, the content of the sodium tetraborate is between the range 0.1 wt % and 10 wt % and the content of the sodium silicate solution is between 0 wt % and 20 wt %.

In accordance with embodiments of this invention, in the step of de-molding and curing the sample, the sample is cured by using microwaves. Microwaves are applied to the sample for a period of at least one minute in order to dry and pre-heat the sample.

In accordance with embodiments of this invention, the first elevated temperature is between 400° C. and 600° C., and the first period of time is between 15 minutes and 3 hours. The sample is heated to the first elevated temperature at a heating rate between 1° C.min$^{-1}$ and 15° C.min$^{-1}$.

In accordance with further embodiments of this invention, the second elevated temperature is between 700° C. and 1000° C., and the second period of time is between 15 minutes and 2 hours. The sample is heated from the first elevated temperature to the second elevated temperature at a heating rate between 1° C.min$^{-1}$ and 15° C.min$^{-1}$.

In accordance with embodiments of this invention, the first lowered temperature is in the range between 500° C. and 650° C., and the third period of time is between 15 minutes and 2 hours.

In accordance with further embodiments of this invention, the glass particles comprise crushed waste glass.

In accordance with embodiments of this invention, the foam glass has a plurality of open pores that are formed within a uniformly foamed open pore matrix. The uniformly foamed open pore matrix has a compressive strength between 2.1 MPa and 2.8 MPa, bulk densities between 0.17 gcm$^{-3}$ and 0.22 gcm$^{-3}$ and an open pore content between 88% and 95%.

In accordance with further embodiments of this invention, the foam glass has pores which are between 0.05 mm and 0.2 mm in size. Furthermore, the open pore matrix of the foam glass has a flexural strength between 0.9 MPa and 1.5 MPa.

BRIEF DESCRIPTION OF THE DRAWINGS

The above advantages and features of a method and apparatus in accordance with this invention are described in the following detailed description and are shown in the drawings.

DETAILED DESCRIPTION

This invention relates to a method for producing foam glass with high open pore content. More particularly, this invention relates to a method for producing foam glass for building materials with thermal insulating and soundproofing properties. Still more particularly, this invention relates to a method for producing light and durable foam glass with high compressive strength in a cost effective manner utilizing recycled waste glass.

The method disclosed in this invention involves a compression step in which a mixture comprising glass particles, foaming agents and binding agent are compressed together. The step of compressing the mixture will result in the foam glass having smaller sized pores and that are formed in more uniformed manner. Furthermore, this compression step results in a foam glass that has high compressive strength and high dimensional stability. By heating the sample in a two step heating process, the foaming of the various concentrations of foaming agents within the mixture may be carefully controlled. The controlled foaming produces a uniform porous glass body with a high content of open pores which has a compressive strength between 2.1 MPa and 2.8 MPA, flexural strength between 0.9 MPa and 1.5 MPa, and bulk density between 0.17 gcm$^{-3}$ and 0.22 gcm$^{-3}$.

Figure 1:
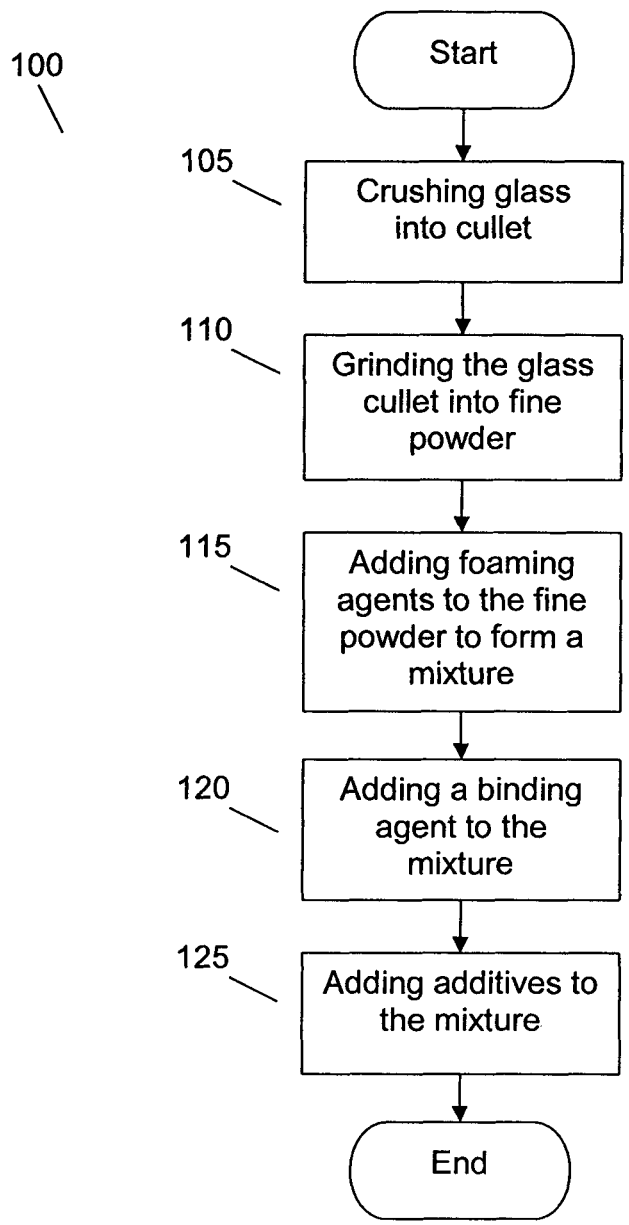
FIG. 1 illustrating a flowchart of a method to produce a mixture for producing foam glass in accordance with an embodiment of this invention.

The steps shown in FIG. 1 produce a mixture that may be used in the production of a foam glass in accordance with an embodiment of this invention. Specifically, FIG. 1 illustrates a flowchart of a method to produce a composition that may be subjected to further processes to produce a foam glass in accordance with an embodiment of this invention. Process 100 begins by crushing waste glass and/or scrap glass into a cullet in step 105. The waste glass may include, but not limited to soda lime glass, glass jars, glass containers, glass bottles and/or various types of unwanted glass material. The waste glass may comprise a single colour or mixed colours. The glass cullet is then ground into a fine powder in step 110. The glass cullet is ground into a fine powder with an average particle size between 1 μm and 100 μm. The size of the glass particles has to be carefully controlled as the size of the glass particles affects the size and uniformity of the pores within the body of a foam glass. A foam glass with small uniform pores will be able to withstand high compressive force. When the size of the glass particles are small, the resulting foam glass will have thinner glass walls which may facilitate the formation of open pores within the body of the foam glass. It is not feasible and not practical for the size of the glass particles to be reduced to below 1 μm as special health precautions would have to be taken when dealing with glass particles of such small size thus increasing the production cost and complexity of the process.

In step 115, foaming agents are added to the fine glass powder to form a mixture. The foaming agents used may be selected from the following compounds: calcium carbonate ($CaCO_3$), sodium carbonate ($Na_2CO_3$), strontium carbonate ($SrCO_3$), magnesium carbonate ($MgCO_3$), calcium sulfate ($CaSO_4$), silicone, silicon carbide (SiC), carbon black, dolomite, antigorite, silicon nitrite ($Si_3N_4$), coke, ammonium nitride ($NH_4NO_3$), poly(ethylene glycol), poly(vinyl alcohol), or sugar. In a preferred embodiment, the foaming agents used in the mixture comprise calcium carbonate, carbon black and poly(ethylene glycol). The amount of foaming agents contained in the mixture are in the range between 0.2 wt % and 10 wt %. One skilled in the art will also recognize that other compositions of foaming agents may be used without departing from this invention.

In step 120, a binding agent is added to the mixture. The binding agent used may comprise a sodium silicate solution. The amount of binding agent contained in the mixture is between the range 0 wt % and 20 wt %. In step 125, additives are added to the mixture. The additives added may be selected from the following compounds: sodium tetraborate ($Na_2B_4O_7$), sodium phosphate monobasic ($NaH_2PO_4$), sodium phosphate dibasic ($Na_2HPO_4$), boric acid ($H_3BO_3$), sodium nitrite ($NaNO_3$), manganese oxide ($MnO_2$), antimony oxide ($Sb_2O_3$), sodium hexafluorosilicate ($Na_2SiF_6$) or sodium metasilicate ($Na_2SiO_3$). In a preferred embodiment, the additives added to the mixture comprise sodium tetraborate, sodium phosphate dibasic and manganese oxide. The amount of additives contained in the mixture is between the range 0.1 wt % and 10 wt %. One skilled in the art will also recognize that other compositions of binding agents and additives may be used without departing from this invention.

While the foaming agents, binding agent and additives are added to the fine glass powder, the mixture is continuously fragmentized together. The fragmentization of the foaming agent and glass particles causes the mixture to be uniformly distributed. In an embodiment of this invention, a ball mill is used to fragmentize the mixture. However, one skilled in the art will recognize that other means for fragmentizing may be used without departing from this invention as long as the fragmentizing substantially distributes the glass particles and foaming agent homogenously throughout the mixture.

In accordance with an embodiment of this invention, the mixture may contain foaming agents in the range between 0.2 wt % and 10 wt %, a binding agent in the range between 0 wt % and 20 wt %, additives in the range between 0.1 wt % and 10 wt % with fine glass powder making up the remainder of the mixture.

Figure 2:
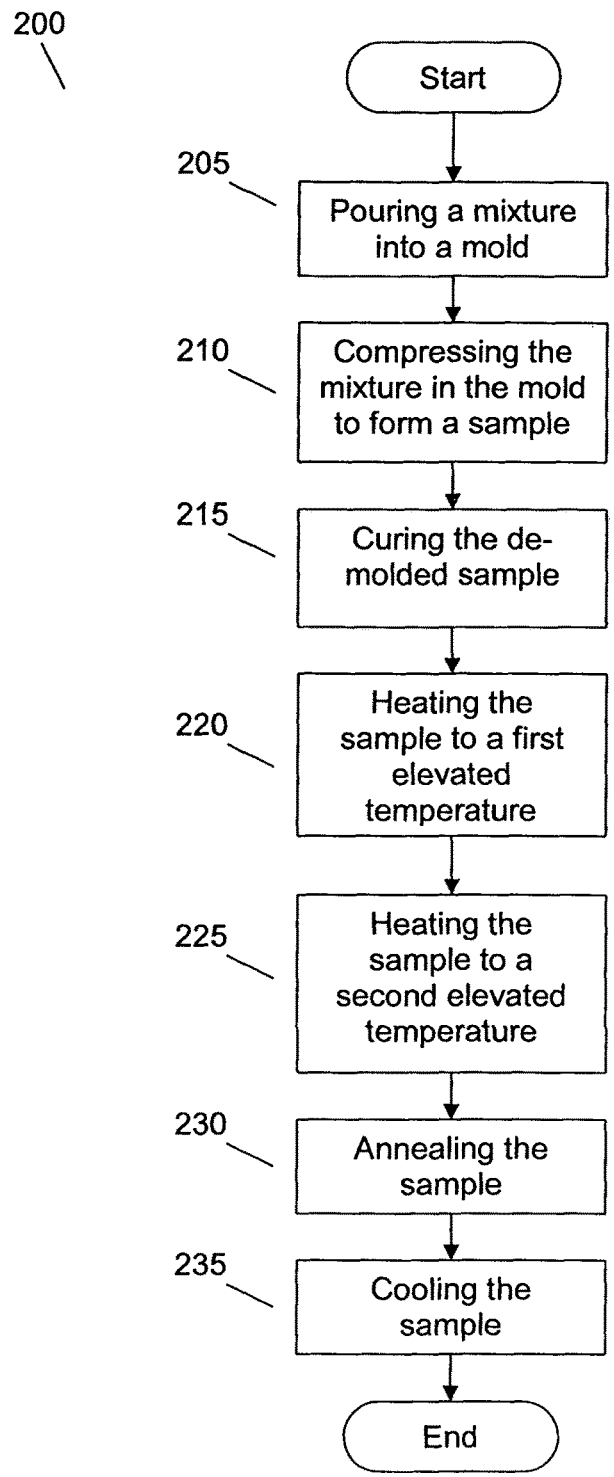
FIG. 2 illustrating a flowchart of a method to produce a foam glass in accordance with an embodiment of this invention.

The steps set out in FIG. 2 produces a foam glass in accordance with an embodiment of this invention. Process 200 begins in step 205 by pouring the mixture produced from process 100 into a mold. The mold may comprise of a standard steel mold that is able to withstand high compression pressures. The mixture is then compressed in the mold for a period of time. The compression of the mixture may be carried out by a hydraulic press. In an embodiment of this invention, the mixture may be compressed with a compression pressure between 2 MPa and 20 MPa for a period between 30 seconds and 15 minutes producing a compressed sample. In a preferred embodiment of this invention, the mixture may be compressed with a compression pressure between 4 MPa and 10 MPa for a period between 5 minutes to 8 minutes producing a compressed sample. The compression of the mixture prior to applying heat increases the heat conduction coefficient of the sample. This in turn results in an increase in the heating efficiency of the sample and uniformity of the formed pores. Furthermore, a compressed sample is able to better retain gas from the decomposition of foaming agents before the glass particles in the mixture softens and foams. By trapping and retaining gas within the compressed sample, this ensures that gas is readily available within the body of the sample for the step of carbon oxidation and foaming. The compressed sample is then de-molded in anticipation of the next step.

In step 215, the de-molded sample is cured using microwaves or traditional heating methods for at least 1 minute. The sample is irradiated with microwaves as microwaves will dehydrate the sample and pre-heat the sample for the subsequent heating steps. The microwaves may be supplied by a conventional microwave oven. One skilled in the art will recognize that other means of producing microwaves may be utilized in step 215 without departing from this invention. In step 220, the sample is then heated to a first elevated temperature and maintained at the first elevated temperature for a period of time. In an embodiment of this invention, the heating rate of the sample is between 1° C./min and 15° C./min and the first elevated temperature is between 400° C. and 600° C. The sample is maintained at this temperature between 15 minutes to 3 hours. In a preferred embodiment of this invention, the heating rate of the sample is between 3° C./min and 8° C./min and the first elevated temperature is between 450° C. and 580° C. The sample is maintained at this temperature between 1 hour to 2 hours.

In step 220, some of the foaming agents contained within the compressed sample will begin to decompose. The foaming agents that combust at the first elevated temperature range generate gases like carbon dioxide and carbon monoxide. The generated gases create gas channels and closed gas capsules within the hardened sample. These gas channels and gas capsules facilitate the penetration of ambient oxygen through the glass sample for the later oxidation process and for the later formation of open pore structures within the glass body. The generated gases will then react with the carbon in the mixture when the sample is heated from the first elevated temperature to the second elevated temperature. The reaction of these gases with the carbon component will result in the generation of a large volume of carbon monoxide gases. It is the large volume generation of carbon monoxide gases that causes the formation of open pores within the body.

In step 225, the sample is heated from the first elevated temperature to a second elevated temperature and maintained at the second elevated temperature for a period of time. In an embodiment of this invention, the heating rate of the sample is between 1° C./min and 15° C./min and the second elevated temperature is between 700° C. and 1000° C. The sample is maintained at this temperature between 15 minutes to 2 hours. In a preferred embodiment of this invention, the heating rate of the sample is between 3° C./min and 8° C./min and the first elevated temperature is between 800° C. and 925° C. The sample is maintained at this temperature between 0.5 hour to 1 hour.

When the sample is heated to the second elevated temperature, the body of the sample will become viscous. Large volumes of carbon monoxide or carbon dioxide gases will be generated at this temperature range due to the decomposition of the remaining foaming agents. Smaller sized pores will also begin to form within this expanding viscous body. These pores will be interconnected by small channels but upon further heating of the sample, these channels will disappear forming larger open pores within the body of the sample. As the sample has previously been compressed, heat is distributed across the entire sample in a uniform manner. This in turn results in the decomposition of the foaming agents in a controlled uniform manner.

In step 230, the sample is then cooled from the second elevated temperature to a first lowered temperature and maintained at the first lowered temperature for a period of time for the annealing of the sample. In accordance with an embodiment of this invention, the first lowered temperature is between 500° C. and 650° C. and the sample is maintained at this temperature range between 15 minutes to 2 hours. In a preferred embodiment of this invention, the first lowered temperature is between 525° C. and 625° C. and the sample is maintained at this temperature range between 30 minutes to 1 hour. The sample is then cooled to room temperature in step 235.

Figure 3:
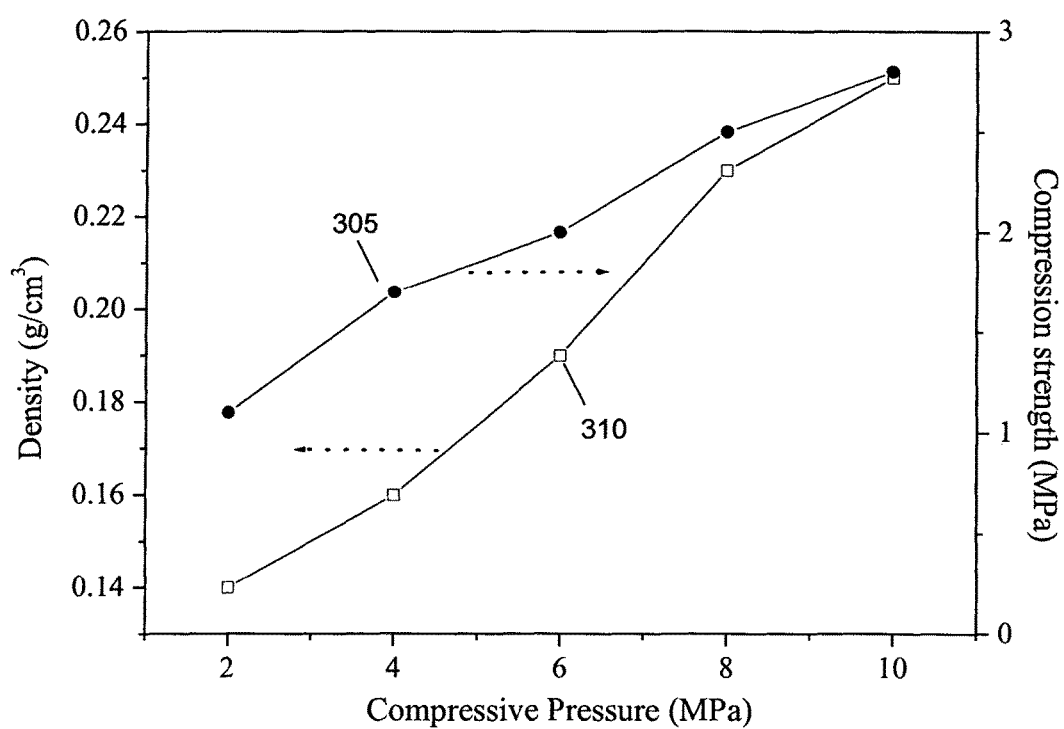
FIG. 3 illustrating the relationship between compressive pressure, and the bulk density and compression strength of the foam glass.

The step of compressing the mixture, that is step 210, plays a critical role in ensuring that the foam glass has uniformly formed pores, high compressive strength and dimensional stability. Furthermore, it was found that the bulk density of the foam glass could be adjusted by controlling the compression pressure and compression time of the mixture. The relationship between the bulk density and the compressive pressure applied to the mixture is shown in FIG. 3. The bulk density of foam glass is an indicator of how well the foam glass retains the porous structure within the foam glass's open pore matrix. Generally, foam glasses with lower densities will have greater void volume and as such, are much lighter. Such foam glass will also have better insulation efficiency due to the greater void volume within the body. Line 310 shows that at the compressive pressure applied at step 210 increases, the bulk density of the foam glass increases as well.

FIG. 3 also shows the relationship between the foam glass's compressive strength and the compression pressure applied to the mixture. The compressive strength of a foam glass is a measure of the stress at which the material fails. As such, foam glass with higher compressive strength is always preferred for building materials. Line 305 shows that as the compressive pressure applied at step 210 increases, the compressive strength of the produced foam glass also increases. This increase in compressive strength is attributed to the uniformity of the pores and the size of the pores. Basically, when the mixture is compressed with high compressive pressure, the resulting foam glass will have pores that are more uniform and of a smaller size. This in turn results in an increase in compressive strength of the foam glass. By increasing the compressive pressure applied to the mixture in step 210, a foam glass with higher compressive strength and higher bulk density may be produced. Based on the graph in FIG. 3, it can be seen that a trade-off exists between the bulk density of the foam glass, which should be kept low, and the compressive strength of the foam glass, which should be as high as possible. In an embodiment of this invention, the compressive pressure applied to the mixture is in the range between 2 MPa to 20 MPa. In a preferred embodiment of this invention, the compressive pressure applied to the mixture is in the range between 4 MPa and 10 MPa.

Figure 4:
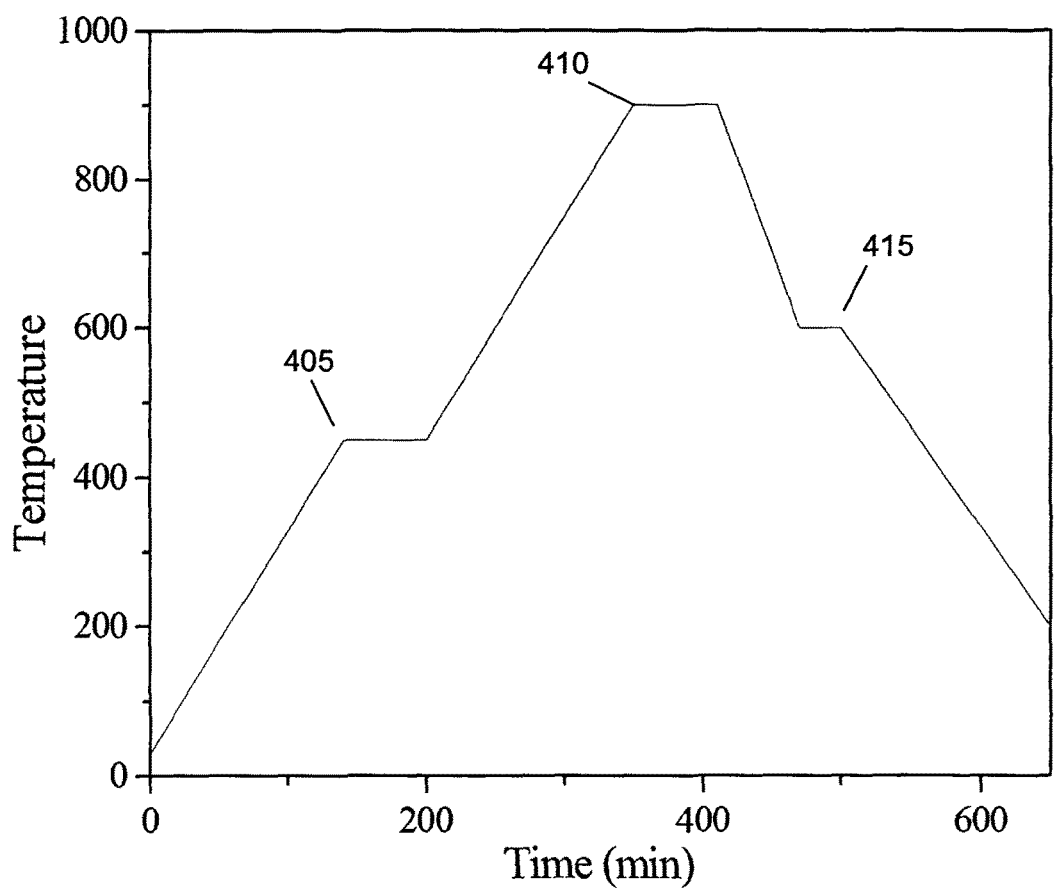
FIG. 4 illustrating the heating profile applied to a sample in accordance with an embodiment of this invention.

FIG. 4 illustrates the three different stages of heating that may be applied to the mixture. Specifically, FIG. 4 illustrates first elevated temperature range 405, second elevated temperature range 410 and first lowered temperature range 415. When the sample is heated to first elevated temperature range 405, part of the foaming agents within the sample will decompose and combust. The decomposition of these foaming agents generates gases such as carbon monoxide, carbon dioxide and water vapour. These decomposing gases create gas channels within the hardened sample. The creation of gas channels within the sample facilitates the penetration of ambient oxygen throughout the sample. In an embodiment of this invention, the poly(ethylene glycol) will begin to decompose at first elevated temperature range 405 generating carbon monoxide, carbon dioxide and water vapour. At second elevated temperature range 410, glass particles within the sample will begin to melt producing a sample with a semi-viscous body. The remainder of the foaming agents within the sample will also begin to decompose. The remaining carbon components will then react with the ambient oxygen within the sample generating volumes of gas which in turn creates pores within the viscous glass body, producing a uniformly foamed open pore matrix. In an embodiment of this invention, calcium carbonate will decompose and carbon black will react with the gases within the sample to generate large volumes of gas. When the temperature applied to the sample is lowered to first lowered temperature range 415, the sample begins to loose its viscosity as the sample cools. At this temperature range, the sample hardens and strengthens as the sample is annealed. The sample is then cooled to room temperature producing the final foam glass article.

Figure 5:
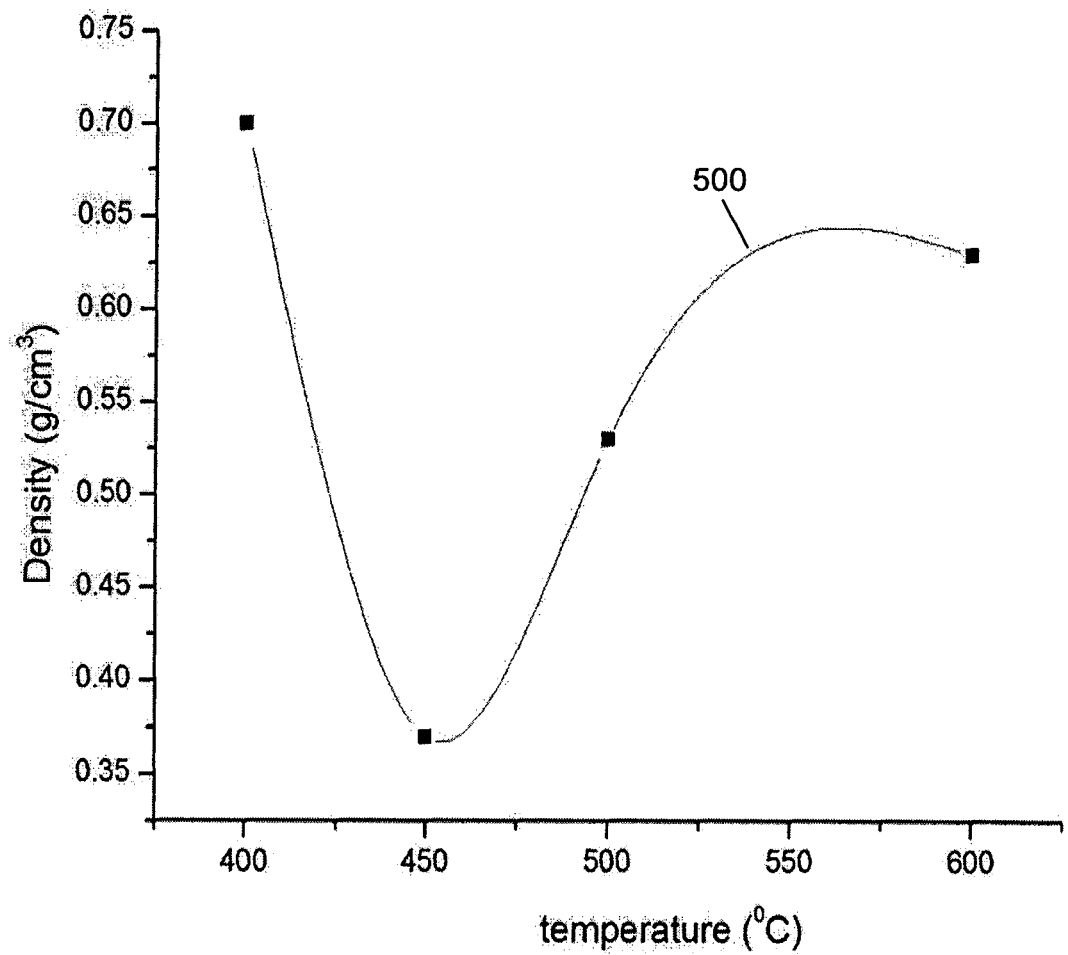
FIG. 5 illustrating the relationship between the bulk density of the foam glass and the temperature range of the first elevated temperature.

Line 500 in FIG. 5 illustrates the relationship between the bulk density of the foam glass and the first elevated temperature as the first elevated temperature is increased from 400° C. to 600° C. The graph shows that the local minimum of line 500 occurs when the first elevated temperature is around 450° C. When the first elevated temperature is lower than 400° C., the heating of the sample will be non-uniformed which results in unevenly formed pores. When the first elevated temperature exceeds 600° C., this will result in premature decomposition of all the foaming agents. Under such a situation, the total gases available for the later foaming process will be insufficient as the prematurely generated gases will have escaped from the non-viscous body. In order to produce a foam glass with a low bulk density and uniform pores which are small in size, the decomposition of the foaming agents has to be carried out in a controlled manner. When premature decomposition occurs, the foaming process will become uncontrollable thus increasing the bulk density of the foam glass due to the production of uneven pores.

Figure 6:
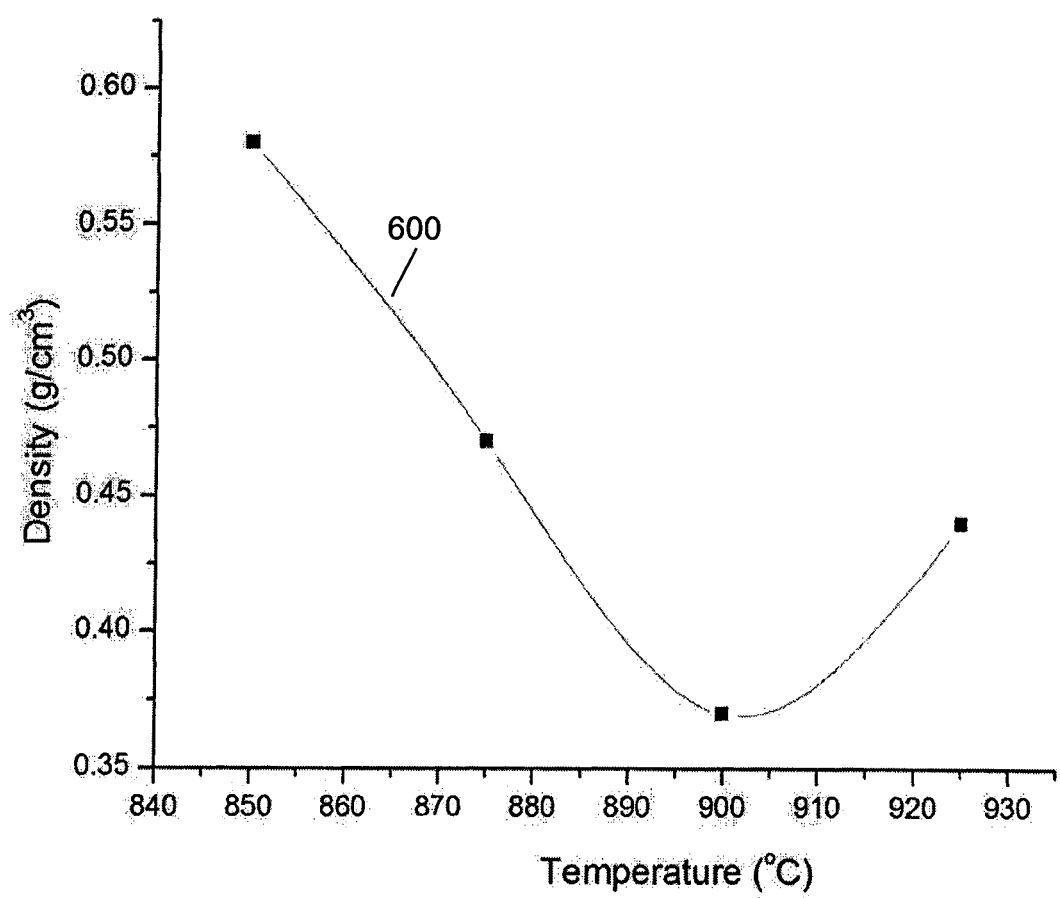
FIG. 6 illustrating the relationship between the bulk density of the foam glass and the temperature range of the second elevated temperature.

Line 600 in FIG. 6 illustrates the relationship between the bulk density of the foam glass and the second elevated temperature as the second elevated temperature is increased from 850° C. to 930° C. The graph shows that the local minimum of line 600 occurs when the second elevated temperature is around 900° C. The second elevated temperature has to be at least 850° C. as the foaming agents within the sample would not be able to decompose completely at temperatures below 850° C. Furthermore, the glass particles within the sample will only achieve the required viscosity for foaming at 850° C. If the glass particles are not softened, they will be unable to retain the gases from the foaming agents. On the other temperature spectrum, if the second elevated temperature were to be increased beyond 930° C., the viscosity of glass particles within the sample would become too low, allowing the trapped gas to escape. Furthermore, as the sample is not in a mold, the sample may loose its shape and the resulting foam glass would be a distorted shape with unevenly formed pores of various sizes.

The foam glass produced in accordance with an embodiment of this invention was found to have open pore content between 88% and 95%, bulk densities between 0.17 g cm$^{-3}$ and 0.22 g cm$^{-3}$, compressive strength between 2.1 MPa and 2.8 MPa and flexural strength between 0.9 Mpa and 1.5 MPa. The sizes of the pores in the body of the foam glass are between 0.05 mm and 0.2 mm. The low bulk density and high open pore content makes it ideal for use in a wide variety of thermal insulating and sound proofing non-structural building materials.

The following examples illustrate various embodiments of the invention in which the content of the foaming agents and additives are varied. One skilled in the art will recognize that various other combinations of foaming agents and additives may be used without departing from this invention.

EXAMPLE 1

Figure 7:
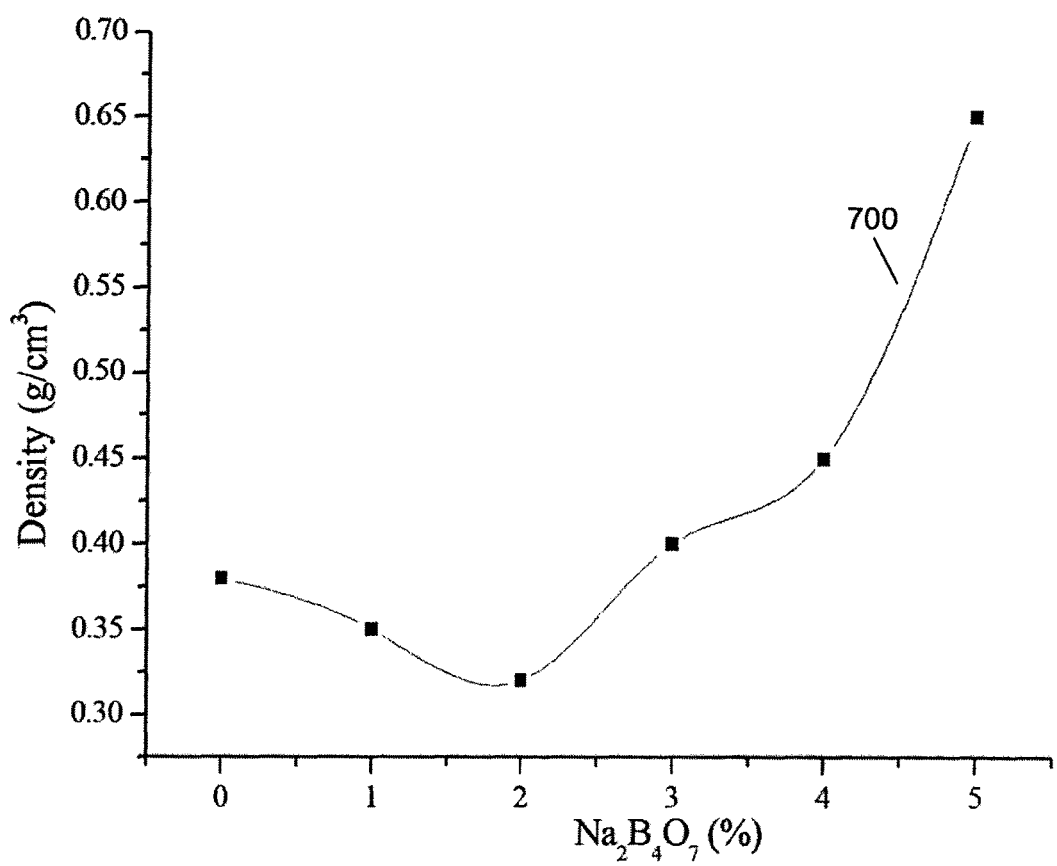
FIG. 7 illustrating the relationship between the bulk density of the foam glass and the concentration of the additive sodium tetraborate.

In order to better control the bulk density of the foam glass, additives may be added to the mixture. FIG. 7 illustrates the relationship between the bulk density of the foam glass and the concentration of the additive sodium tetraborate. Line 700 illustrates the change in the bulk density of the foam glass when the content of the additive comprising sodium tetraborate is increased. For this experiment, the mixture comprised fine glass powder, 4 wt % of calcium carbonate, 9 wt % of sodium silicate solution and sodium tetraborate between 0 wt % to 5 wt %. The graph shows that the local minimum of line 700 occurs when the content of sodium tetraborate is around 2 wt %.

EXAMPLE 2

Figure 8:
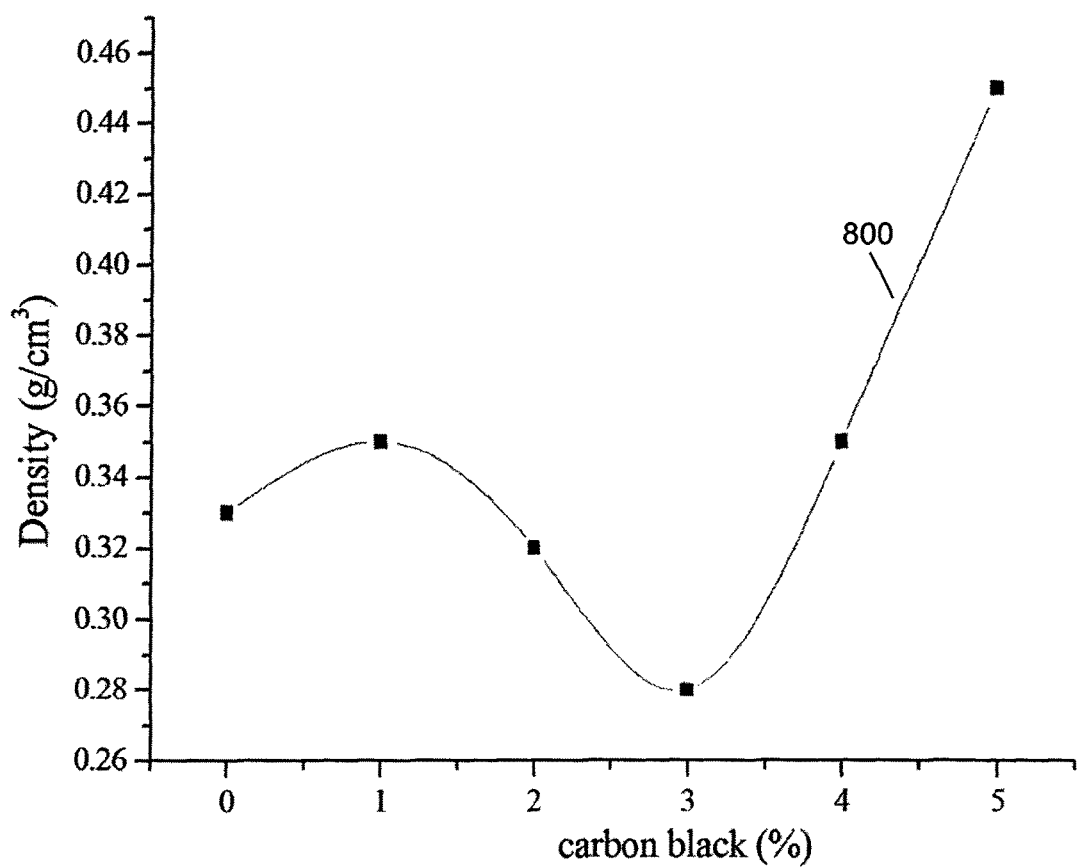
FIG. 8 illustrating the relationship between the bulk density of the foam glass and the concentration of the foaming agent carbon black.

FIG. 8 illustrates the relationship between the bulk density of the foam glass and the concentration of carbon black. Line 800 illustrates the change in the bulk density when the content of the foaming agents comprise varying amounts of carbon black. For this experiment, the mixture comprised fine glass powder, 4 wt % of calcium carbonate, 9 wt % of sodium silicate solution, 2 wt % sodium tetraborate and carbon black between 0 wt % to 5 wt %. This graph shows that the local minimum of line 800 occurs when the content of carbon black is around 3 wt %.

EXAMPLE 3

Figure 9:
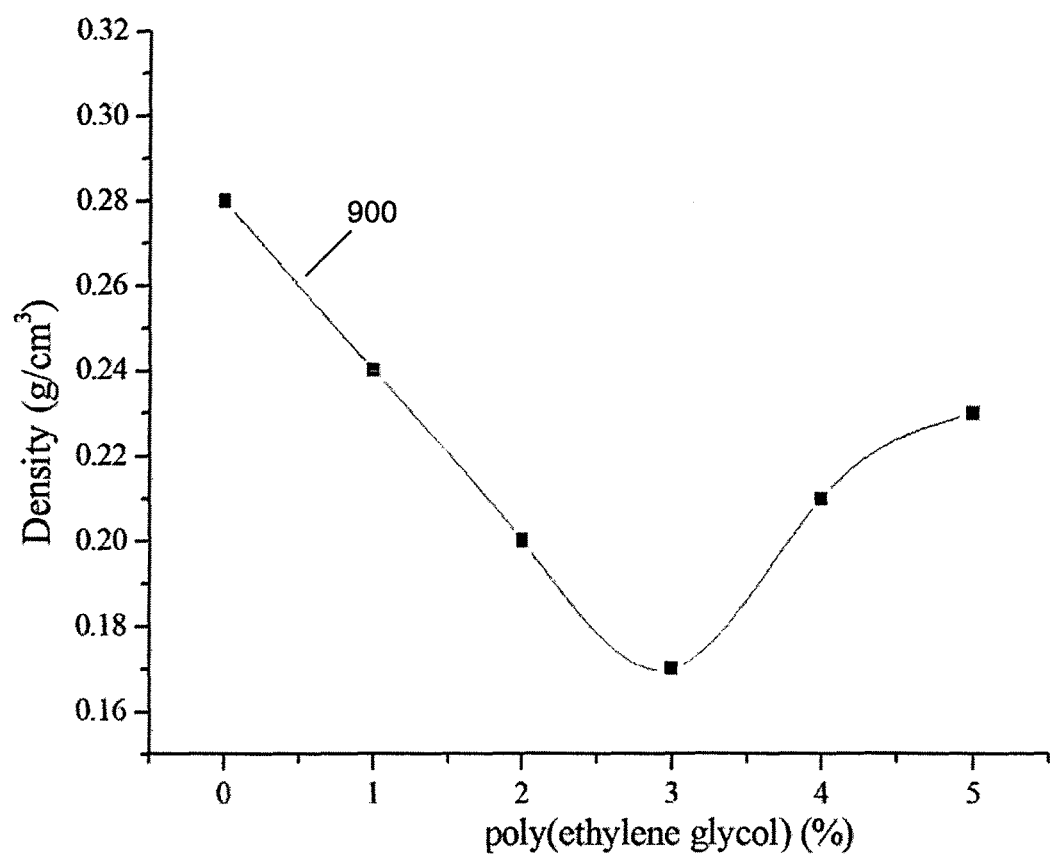
FIG. 9 illustrating the relationship between the bulk density of the foam glass and the concentration of the foaming agent poly(ethyleneglycol).

FIG. 9 illustrates the relationship between the bulk density of the foam glass and the concentration of poly(ethylene glycol). Line 900 illustrate the change in the bulk density of the foam glass when the content of the foaming agents comprise varying amounts of poly(ethylene glycol). For this experiment, the mixture comprised fine glass powder, 4 wt % of calcium carbonate, 9 wt % of sodium silicate solution, 2 wt % sodium tetraborate, 3 wt % carbon black and poly(ethylene glycol) between 0 wt % to 5 wt %. This graph shows that the local minimum of line 900 occurs when the content of poly(ethylene glycol) is around 3 wt %.

In a preferred embodiment of this invention, the mixture used to produce the foam glass comprises calcium carbonate, carbon black and poly(ethyleneglycol), sodium tetraborate and a sodium silicate solution. In this embodiment, the foaming agents comprised of 4 wt % of calcium carbonate, 3 wt % of poly(ethylene glycol) and 3 wt % carbon black while the additives comprised of 2 wt % sodium tetraborate and the binding agent comprised 9 wt % sodium silicate. The balance of the mixture comprises crushed glass particles.

The above is a description of a foam glass for use in the construction industry due to its excellent sound insulating properties, high compressive strength and low bulk density. It is foreseen that those skilled in the art can and will design alternative embodiments of this invention as set forth in the following claims.

The invention claimed is:

1. A method for producing foam glass comprising the steps of:
    combining glass particles with foaming agents, additives and a binding agent to form a mixture;
    compressing the mixture in a mold with a compression pressure between 2 MPa and 20 MPa for a period of time between 30 seconds and 15 minutes to form a compressed sample;
    de-molding the sample and curing the sample;
    heating the sample to a first elevated temperature and maintaining the sample at the first elevated temperature for a first period of time to decompose a part of the foaming agents;
    heating the sample from the first elevated temperature to a second elevated temperature and maintaining the sample at the second elevated temperature for a second period of time to decompose the remainder of the foaming agents;
    cooling the sample from the second elevated temperature to a first lowered temperature for a third period of time to anneal the sample; and
    cooling the sample from the first lowered temperature to an ambient room temperature, the cooled sample having open pore content between 88% and 95%, compression strength between 2.1 MPa and 2.8 MPa, and bulk densities between 0.17 g cm$^{-3}$ and 0.22 g cm$^{-3}$.

2. The method according to claim 1 wherein the foaming agents are selected from a group consisting of:
    calcium carbonate, sodium carbonate, strontium carbonate, magnesium carbonate, calcium sulphate, silicone, silicon carbide, carbon black, dolomite, antigorite, silicon nitride, coke, ammonium nitride, poly(vinyl alcohol), poly(ethyleneglycol) and sugar.

3. The method according to claim 2 wherein the foaming agents are in the range between 0.2 wt % and 10 wt %.

4. The method according to claim 1 wherein the foaming agents comprise calcium carbonate, carbon black, and poly(ethyleneglycol).

5. The method according to claim 1 wherein in the step of heating the sample to a first elevated temperature, the part of the foaming agents comprises poly(ethyleneglycol).

6. The method according to claim 5 wherein the additives are in the range between 0.1 wt % and 10 wt %.

7. The method according to claim 1 wherein the additives are selected from a group consisting of:
    sodium tetraborate, sodium phosphate monobasic, sodium phosphate dibasic, boric acid, sodium nitrite, manganese oxide, antimony oxide, sodium hexafluorosilicate and sodium metasilicate.

8. The method according to claim 1 wherein the additives comprise sodium tetraborate.

9. The method according to claim 1 wherein the binding agent comprises a sodium silicate solution.

10. The method according to claim 9 wherein the binding agent is in the range between 0 wt % and 20 wt %.

11. The method according to claim 1 wherein the glass particles comprise fine glass powder between 1 μm and 100 μm in size.

12. The method according to claim 1 wherein:
    the foaming agents comprise calcium carbonate, carbon black, and poly(ethyleneglycol); the additives comprise sodium tetraborate; and the binding agent comprises a sodium silicate solution.

13. The method according to claim 12 wherein:
    the content of calcium carbonate, carbon black and poly(ethyleneglycol) are between the range 0.2 wt % and 10 wt %;
    the content of sodium tetraborate is between the range 0.1 wt % and 10 wt %; and the content of the sodium silicate solution is between the range 0 wt % and 20 wt %.

14. The method according to claim 1 wherein the step of de-molding the sample and curing the sample comprises:
    applying microwaves for a period of at least one minute to the de-molded sample to dehydrate and pre-heat the sample.

15. The method according to claim 1 wherein:
    the first elevated temperature is between 400° C. and 600° C.

16. The method according to claim 15 wherein:
    the first period of time is between 15 minutes and 3 hours.

17. The method according to claim 15 wherein the sample is heated to the first elevated temperature at a heating rate between 1° C.min$^{-1}$ and 15° C.min$^{-1}$.

18. The method according to claim 1 wherein:
    the second elevated temperature is between 700° C. and 1000° C.

19. The method according to claim 18 wherein:
    the second period of time is between 15 minutes and 2 hours.

20. The method according to claim 19 wherein:
    the sample is heated from the first elevated temperature to the second elevated temperature at a heating rate between 1° C.min$^{-1}$ and 15° C.min$^{-1}$.

21. The method according to claim 1 wherein:
    the first lowered temperature is between 500° C. and 650° C.

22. The method according to claim 21 wherein:
    the third period of time is between 15 minutes and 2 hours.

23. The method according to claim 1 wherein the glass particles comprise crushed waste glass.

24. The method according to claim 1 wherein the step of compressing the mixture in the mold comprises:
    applying a hydraulic press to the mold.

* * * * *